United States Patent [19]
Sommer et al.

[11] Patent Number: 5,918,834
[45] Date of Patent: Jul. 6, 1999

[54] RETRACTABLE SENSOR SYSTEM FOR AN AIRCRAFT

[75] Inventors: William Arthur Sommer, St. Louis; Robert Henry Wille, St. Charles, both of Mo.

[73] Assignee: McDonnell Douglas

[21] Appl. No.: 08/807,762

[22] Filed: Feb. 27, 1997

[51] Int. Cl.⁶ .............. B64C 1/00; B64C 1/38; H01Q 1/28
[52] U.S. Cl. .......... 244/129.1; 244/130; 343/705
[58] Field of Search ............ 244/1 R, 119, 244/129.1, 130, 131, 133, 137.1, 118.1; 343/705; 250/338.1; 73/178 R, 147, 184

[56] References Cited

U.S. PATENT DOCUMENTS

| | | | |
|---|---|---|---|
| 3,656,164 | 4/1972 | Rempt | 343/705 |
| 3,754,267 | 8/1973 | Walters et al. | 343/705 |
| 4,538,154 | 8/1985 | Staehlin | 343/705 |
| 4,593,288 | 6/1986 | Fitzpatrick | 343/705 |
| 4,887,779 | 12/1989 | Large | 244/1 R |
| 5,222,699 | 6/1993 | Albach et al. | |
| 5,803,405 | 9/1998 | Ellis et al. | 244/130 |

FOREIGN PATENT DOCUMENTS 1492173 11/1977 United Kingdom ........... 343/705

*Primary Examiner*—Charles T. Jordan
*Assistant Examiner*—Theresa M. Wesson
*Attorney, Agent, or Firm*—Dale B. Halling

[57] ABSTRACT

A retractable sensor system (12) for an aircraft has a sensor (16) coupled to an actuation mechanism (18). The sensor (16) moves from a retracted position to an expanded position. A reinforced elastomer section (14) in an exterior surface (48) of the aircraft covers the sensor (16) and the actuation mechanism (18). The reinforced elastomer section (14) has an interior surface and an exterior surface and the sensor (16) has a portion adjacent to the interior surface. The reinforced elastomer section (14) has a flush position and an expanded position.

21 Claims, 4 Drawing Sheets

RETRACTABLE SENSOR SYSTEM FOR AN AIRCRAFT

FIELD OF THE INVENTION

The present invention relates generally to the field of aircraft sensor systems and more particularly to a retractable sensor system for an aircraft.

BACKGROUND OF THE INVENTION

Modern aircraft require a number of sensor systems. Sensors are critical to the performance of modern aircraft. For instance, modern aircraft often have an optical sensor that protrudes outside the moldline to see effectively. These sensors allow the pilot to see many features of the landscape in the dark. Unfortunately, these optical sensors result in significant aerodynamic drag. Additionally, the angularity of these fixed apertures may originate vertical airflow (in some flight conditions) which cause propulsive losses if ingested into the jet intake.

Modern aircraft often do not have rear facing radar because they create unacceptable levels of aerodynamic drag. However, threats often appear from behind the aircraft, where the forward facing radar cannot detect them.

Thus, there exists a need for a sensor system that can reduce the aerodynamic drag created by present sensor systems.

SUMMARY OF THE INVENTION

A retractable sensor system for an aircraft that overcomes these and other problems has a sensor coupled to an actuation mechanism. The sensor moves from a retracted position to an expanded position. Reinforced elastomer sections on the moldline surface of the aircraft covers the sensor and the actuation mechanism. The reinforced elastomer section has an interior surface and an exterior surface and the sensor is adjacent to the interior surface. The reinforced elastomer section has a flush position and an expanded position.

DETAILED DESCRIPTION OF THE DRAWINGS

Figure 1:
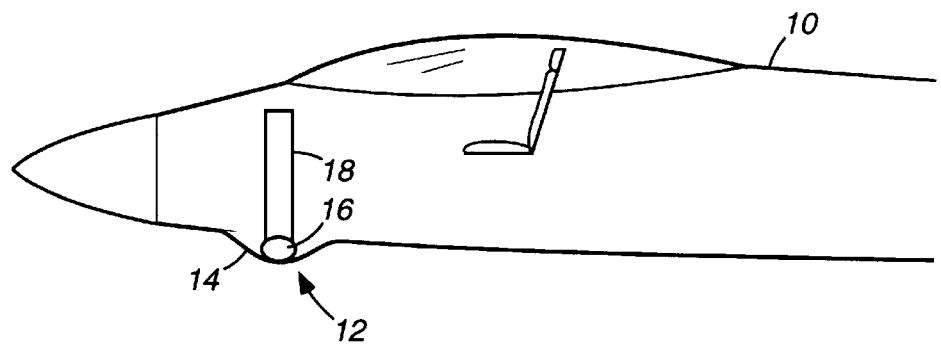
FIG. 1 is a schematic diagram of partial side view of an aircraft with a retractable optical sensor.
Figure 2:
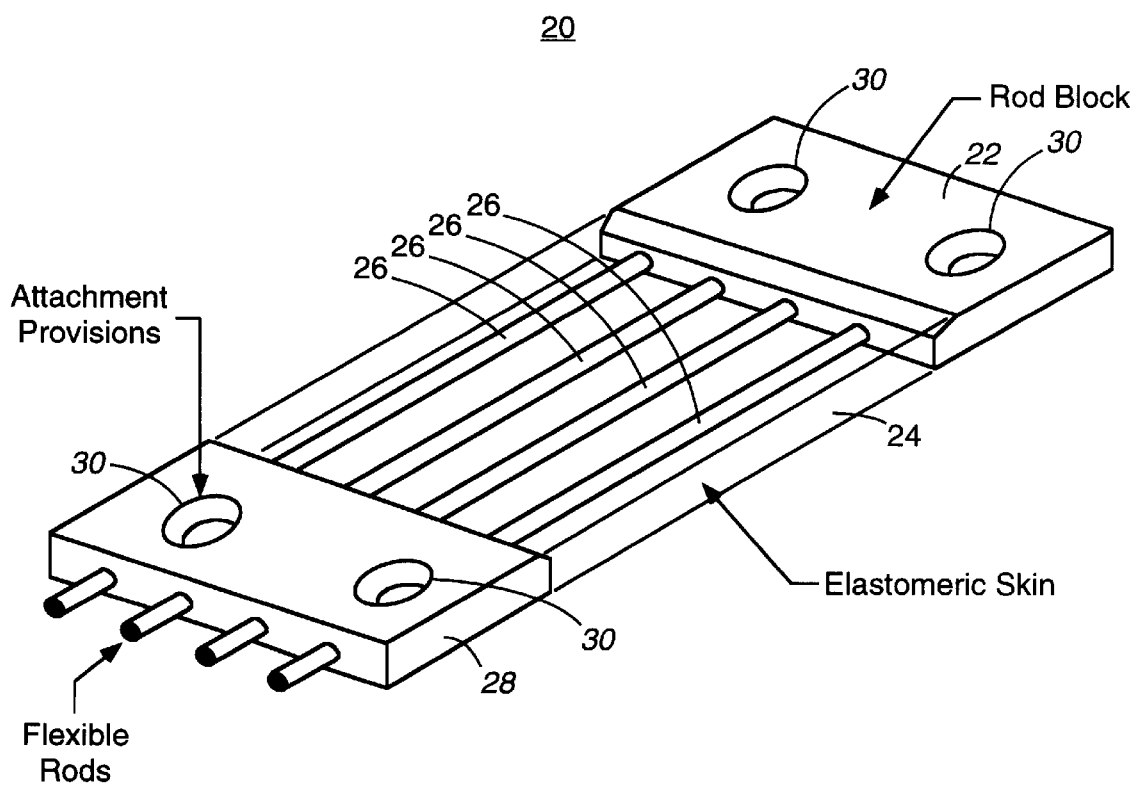
FIG. 2 is a perspective view of a reinforced elastomer panel.

FIG. 1 is a schematic drawing of an aircraft 10 having a retractable optical sensor system 12. A reinforced elastomer section 14 expands to allow the electro optic sensor 16 to view the surroundings. An actuation mechanism 18 translates the sensor 16 from a retracted position (first position) to an active position (second position). The key to building a retractable electro optic sensor system 12 is designing a reinforced elastomer section 14 that provides a smooth aerodynamic surface in both the active and retracted positions. FIG. 2 shows an example of an elastomer panel 20 that allows the reinforced elastomer section 14 to provide an aerodynamic surface in all positions.

The elastomer panel 20 has a rod block 22 attached along one edge to an elastomer skin 24. The elastomer skin 24 is capable of stretching to 100% of its unstressed length. In addition, the elastomer skin 24 is capable of twisting. A plurality of rods 26 are attached to the rod block 22 and are allowed to slide freely inside the elastomer skin 24. The rods 26 are made front quartz, epoxy or composites and flex without breaking. The stiffness of these reinforcements are designed to yield a specific expanded shape. The rods 26 provide the elastomer skin 24 with a curvilinear shape when the elastomer panel 20 is elongated, deflected or twisted. This curvilinear shape provides a good aerodynic shape without any discontinuities that cause turbulence and drag.

A second rod block 28 is attached to an opposite edge of the elastomer skin 24. The second rod block 28 has a plurality of holes through h the plurality of rods 26 are allowed to slide freely. Both the rod block 22 and the second rod block 28 have attachment provisions 30, for attaching the elastomer panel 20 to the surface of an aircraft.

Figure 3:
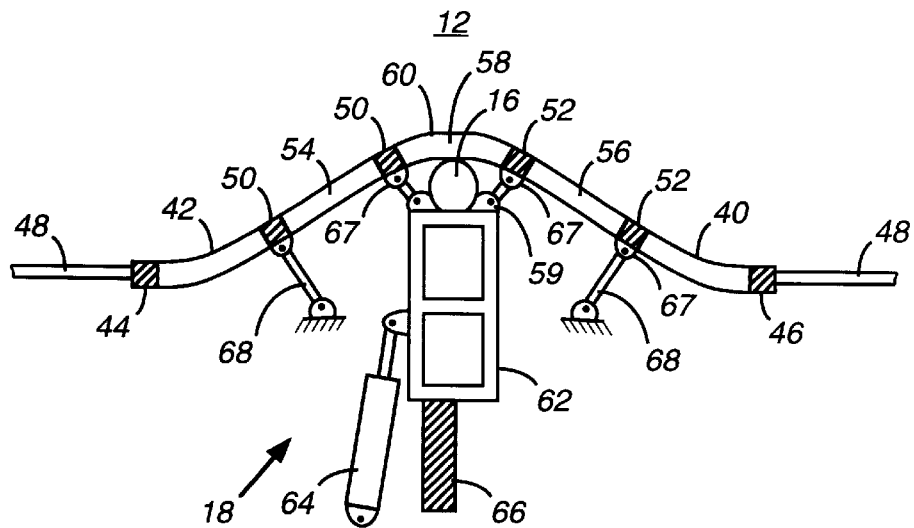
FIG. 3 is cross sectional view along the 3—3 line, through the retractable electro optic sensor in the expanded position (see FIG. 4)

FIG. 3 is a schematic, cross sectional view of the retractable electro optic sensor system 12 in an expended position. The reinforced elastomer section 14 includes a pair of elastomer panels 40, 42 attached at a first end 44, 46 to the skin (exterior surface, portion, second portion) 48 of the aircraft. Note that the skin defines the moldline of the aircraft. The second ends of the elastomer panels (first reinforced elastomer panel & second reinforced elastomer panel) 40, 42 are connected to a first frame 50 and a second frame 52 of a pair of windows 54, 56. In one t the windows 54, 56 are infra-red windows that are transmissive to infra-red light. A top elastomer panel 58 connects to another edge of the frames 50, 52. The elastomer panel 58 has an interior surface 59 and an exterior surface 60.

The electro optic sensor 16 is encased in a spherical ball. This allows the sensor to pivot inside the sphere and point in almost any direction. The spherical ball (portion) is adjacent to the interior surface 59 of the elastomer panel 58. The actuation mechanism 18 in this embodiment is shown as a pallet 62 attached to the electro optic sensor 16. The pallet 62 is moved from a first position to a second position, by a hydraulic actuator 64 attached the pallet 62. The pallet 62 slides on a track 66. Many other actuation mechanisms will be apparent to those skilled in the art. All such mechanisms are considered to be part of the invention as defined in the appended claims. A pair of linkages 67 connect a top portion of the pallet 62 the frames 50, 52. A pair of sliding pivoting mechanisms 68 connect the other end of the frames 50, 52 to the aircraft. In one embodiment a positioning system is used to accurately monitor and adjust the position of the electro optic sensor 16.

Figure 4:
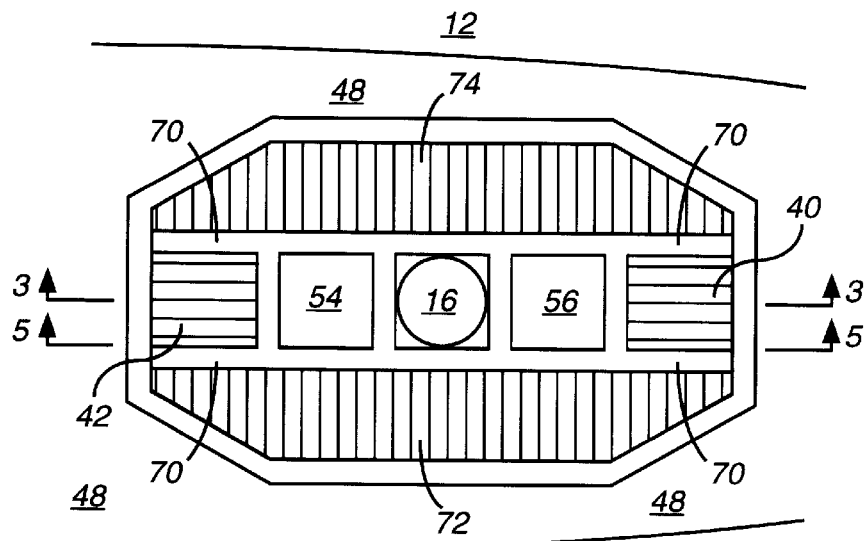
FIG. 4 is a bottom view of the retractable sensor.

FIG. 4 is a schematic drawing of a bottom view of the retractable electro optic sensor system 12. The electro optic sensor 16 is represented by a circle in the center and is actually under a top elastomer panel 58. Adjacent to the top elastomer panel 58 is pair of infra-red windows 54, 56 (pair of ramps). The windows 54, 56 have frames that connect to the pair of elastomer panels 40, 42. The sides 70 of the elastomer panels 40, 42 are made of flexible elastic material in one embodiment. A pair of side elastomer panels 72, 74 connect the sides 70 to the skin (third portion) 48 of the aircraft. The side elastomer panels 72, 74 are also connected to the sides of the windows 54, 56 and the top elastomer panel 58. In one embodiment, the lines in the elastomer panels represent the reinforcing rods.

Figure 5:
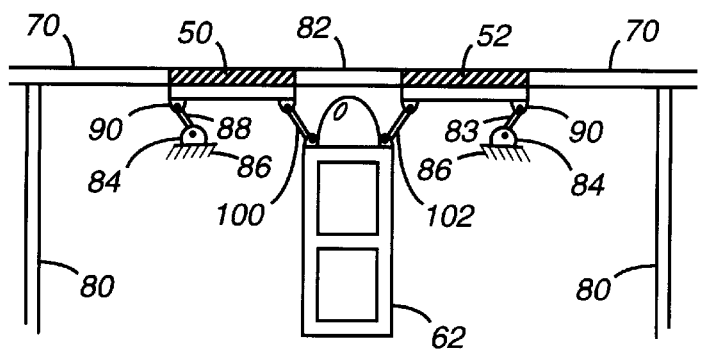
FIG. 5 is a cross sectional view through the retractable sensor along the 5—5 line.

FIG. 5 is a schematic drawing of a cross section through the retractable optical system 12 in the flush position along the 5—5 line. This view shows the linkage mechanisms. The flexible side frames 70 are joined to the rigid frames 50, 52 of the windows 54, 56. The rigid frames 50, 52 are connected to a flexible frame 82 of the top elastomer panel 58. A pair of sliding pivoting mechanisms 84 are connected to posts 86 of the airplane. A pair of linkages 88 connect the sliding pivoting mechanisms 84 to a pair of hinges 90. The hinges 90 are attached to the window frames 50, 52. A second pair of linkages 100, 102 connect to the pallet 62 to the center edges of the frames 50, 52.

Thus there has been described a retractable electro optic sensor that conforms to the moldline of the aircraft when the sensor is not being used. When the sensor is in use, the retractable electro optic sensor forms a smooth curvilinear surface that eliminates turbulence caused by discontinuities. The retractable electro optic system has a significantly reduced aerodynamic drag over prior art sensor systems.

Figure 6:
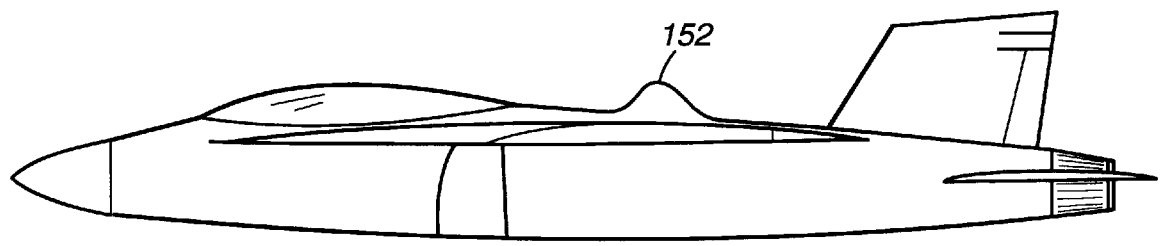
FIG. 6 is a side view of an aircraft with a retractable radar antenna in an active position.

FIG. 6 is a side view of aircraft 150 with another embodiment of a retractable sensor system 152. The retractable sensor system 152 is shown in the expanded position. In this case, the retractable sensor system is a retractable antenna system 152, capable of detecting objects above and behind the aircraft 150. While the retractable antenna is shown on top of the aircraft fuselage, it can located on any surface of the aircraft where a high probability threat exists. The key to designing an effective retractable antenna system 152 is to have the system form a smooth curvilinear shape in any of its multitude of positions.

Figure 7:
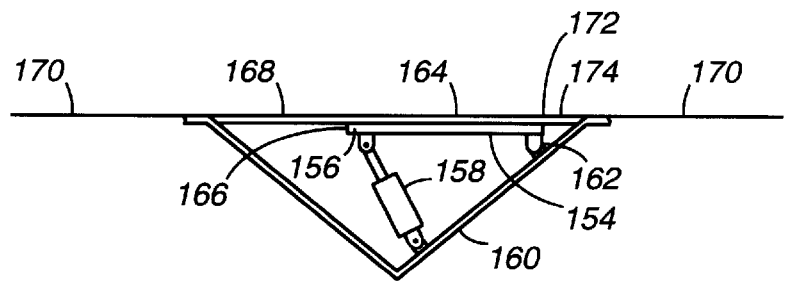
FIG. 7 is a cross sectional view of the retractable radar antenna system in a stowed position.

FIG. 7 is a cross sectional view of the retractable antenna system 152 in the retracted position. An antenna 154 has a frame 156 pivotally connected to an actuation mechanism (pivoting mechanism) 158. In one embodiment the antenna is a phased array antenna and is connected to a radar system. The actuation mechanism 158 is coupled to the aircraft frame 160. A second end of the frame 156 is connected to a sliding pivoting mechanism 162. In one embodiment the antenna 154 is protected by a cover (protective panel) 164. The cover 164 in one embodiment is made of standard radome material and is transmissive of microwaves and radar energy.

A front end 166 of the antenna frame 156 is connected to a reinforced elastomer panel 168. The elastomer panel 168 is also connected to the skin 170 of the aircraft. The back end 172 of the antenna frame is coupled to the aircraft skin 170 by a second reinforced elastomer panel 174.

Figure 8:
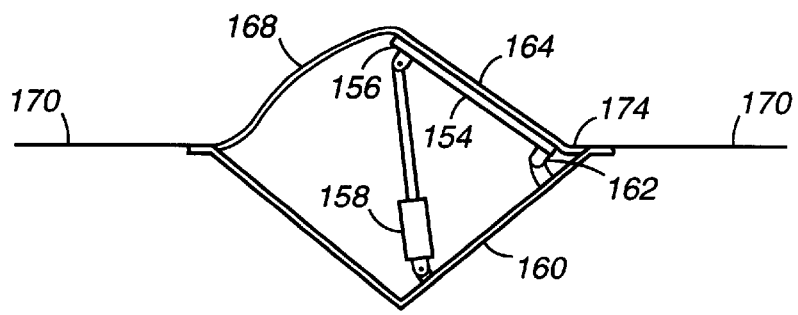
FIG. 8 is a cross sectional view of the retractable antenna system in the active position.

FIG. 8 is a cross section view of the retractable antenna system 152 in the active position. The reinforced elastomer panel 168, 174 forms a smooth curvilinear surface around the antenna 154. The smooth curvilinear surface ensures that there are no discontinuities that create unacceptable levels of turbulence.

Figure 9:
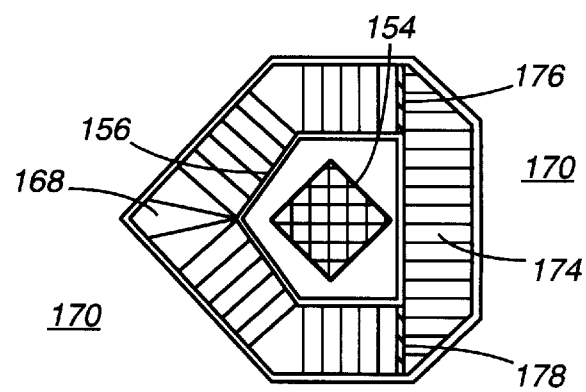
FIG. 9 is a bottom view of the retractable antenna system.

FIG. 9 is a bottom view of the retractable antenna system 152. The center diamond is the radar antenna 154. The antenna 154 is held in place by the frame 156. The perimeter of the frame 156 is surrounded by a reinforced elastomer panel 168, 174. A pair of flexible rod blocks 176, 178 facilitate the transition between the elastomer panel 174 and the elastomer panel 168. The flexible rod blocks 176, 178 can be made of composite, rubber or other flexible materials.

The rods in the elastomer panel 174 are attached to the flexible rod blocks 176, 178. The rods are fixed to the antenna frame and the sliding ends of the rods are along the aircraft skin (rigid portion) 170. This structure provides an expandable structure that maintains a curvilinear shape in all positions. This provides a modern aircraft with a rear facing antenna that does not result in a large fixed aft-facing radome which results in aerodynamic drag when the antenna is not in use.

Thus there has been described a retractable sensor system that does not increase the aerodynamic drag, in the stowed position and significantly reduces the overall aerodynamic drag due to the sensor system. In all of the multitude of positions the retractable sensor system provides a smooth curvilinear shape that reduces the turbulence associated with the sensor to a minimal level. While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A retractable sensor system for an aircraft, comprising:
   a sensor;
   an actuation mechanism coupled to the sensor and moving the sensor from a first position to a second position; and
   a reinforced elastomer section in an exterior surface of the aircraft, the reinforced elastomer section having an interior surface and an exterior surface, the sensor having a portion adjacent to the interior surface, the reinforced elastomer section having a flush position and an expanded position and the reinforced elastomer section includes a plurality of rods that slide freely inside the elastomer skin.

2. The retractable sensor system of claim 1, wherein the sensor is a radar antenna.

3. The retractable sensor system of claim 1, wherein the sensor is an electro optic sensor.

4. The retractable sensor system of claim 1, wherein the reinforced elastomer section is moved from the flush position to the expanded position by a hydraulic actuation mechanism.

5. The retractable sensor system of claim 1, wherein the reinforced elastomer section conforms to a moldline of the aircraft in the flush position.

6. The retractable sensor system of claim 1, wherein the reinforced elastomer section does not conform to a moldline of the aircraft in the expended position.

7. The retractable sensor system of claim 1, further including a protective panel covering the sensor.

8. The retractable sensor system of claim 7, wherein the protective panel is transmissive to infra-red light.

9. The retractable sensor system of claim 7, wherein the protective panel is transmissive to microwaves.

10. A retractable sensor system for an aircraft comprising:
    an electro optic sensor;
    a translatig mechanism connected to the electro optic sensor;
    a pair of ramps coupled to the aircraft and joined by an elastomer skin, the electro optic sensor adjacent to the elastomer skin, the pair of ramps having a flush position and an extended position;
    a first reinforced elastomer panel connected to a first edge of the pair of ramps and a portion of the aircraft; and
    a second reinforced elastomer panel connected to a second edge of the pair of ramps and a second portion of the aircraft.

11. The retractable sensor system of claim 10, wherein the pair of ramps each have a frame with an infra red window inside the frame.

12. The retractable sensor system of claim 10, wherein the pair of ramps and the first reinforced elastomer and the second reinforced elastomer conform to a moldline of the aircraft in the flush position.

13. The retractable sensor system of claim 10, wherein the pair of ramps do not conform to a moldline of the aircraft in the extended position.

14. The retractable sensor system of claim 10, wherein the electro optic sensor has a stowed position and an extended position.

15. The retractable sensor system of claim 10, further including a third reinforced elastomer panel connected between an outside edge of one of the pair of ramps and a third portion of the aircraft.

16. A retractable antenna system for an aircraft, comprising:

a frame;

an antenna attached to the frame;

a pivoting mechanism attached to the frame having a retracted position and an extended position; and a reinforced elastomer panel coupled to a perimeter of the frame and to an edge of a rigid portion of the aircraft.

17. The retractable antenna system of claim 16, wherein the antenna is a phased array antenna.

18. The retractable antenna system of claim 16, further including a radar system connected to the antenna.

19. The retractable antenna system of claim 16, further including a protective panel covering the antenna.

20. The retractable antenna system of claim 19, wherein the reinforced elastomer panel and the protective panel conform to a moldline of the aircraft in the retracted position.

21. The retractable antenna system of claim 19, wherein the reinforced elastomer panel and the protective panel do not conform to a moldline of the aircraft in the extended position.

* * * * *

UNITED STATES PATENT AND TRADEMARK OFFICE
CERTIFICATE OF CORRECTION

PATENT NO. : 5,918,834
DATED      : July 6, 1999
INVENTOR(S): Sommer et al.

It is certified that error appears in the above-indentified patent and that said Letters Patent is hereby corrected as shown below:

On the title page, item [75], add Cynthia Ann Gruensfelder, St. Louis

Signed and Sealed this

Twenty-third Day of November, 1999

*Attest:*

Q. TODD DICKINSON

*Attesting Officer*     *Acting Commissioner of Patents and Trademarks*